United States Patent
Alexander

(10) Patent No.: US 9,453,609 B2
(45) Date of Patent: Sep. 27, 2016

(54) PLUMBER PROTECTOR

(71) Applicant: Joseph Lynn Alexander, Irvine, KY (US)

(72) Inventor: Joseph Lynn Alexander, Irvine, KY (US)

( * ) Notice: Subject to any disclaimer, the term of this patent is extended or adjusted under 35 U.S.C. 154(b) by 24 days.

(21) Appl. No.: 14/499,642

(22) Filed: Sep. 29, 2014

(65) Prior Publication Data

US 2016/0091118 A1  Mar. 31, 2016

(51) Int. Cl.
| | |
|---|---|
| F16L 3/00 | (2006.01) |
| F16M 13/02 | (2006.01) |
| E03C 1/06 | (2006.01) |
| F16L 3/08 | (2006.01) |
| F16L 3/02 | (2006.01) |

(52) U.S. Cl.
CPC ............ *F16M 13/02* (2013.01); *E03C 1/06* (2013.01); *F16L 3/00* (2013.01); *F16L 3/02* (2013.01); *F16L 3/08* (2013.01)

(58) Field of Classification Search
USPC ...... 248/690, 692, 49, 56, 58, 65, 67, 230.1, 248/304, 339; 4/570, 609, 654, 657, 658; 285/45, 46, 48, 53, 54, 55
See application file for complete search history.

(56) References Cited

U.S. PATENT DOCUMENTS

| | | | | |
|---|---|---|---|---|
| 4,158,276 A | * | 6/1979 | Stoneman | E04D 13/1407 454/1 |
| 5,957,503 A | * | 9/1999 | Brown | F16L 23/003 285/13 |
| 6,726,161 B2 | * | 4/2004 | Plump | E03C 1/042 248/205.1 |
| 2006/0196549 A1 | * | 9/2006 | Roje | E03C 1/0408 137/359 |
| 2015/0135847 A1 | * | 5/2015 | Takahama | G01L 1/2206 73/856 |

* cited by examiner

*Primary Examiner* — Alfred J Wujciak
(74) *Attorney, Agent, or Firm* — Dunlap Bennett & Ludwig PLLC

(57) ABSTRACT

A plumber protector is provided. The plumber protector is for supporting a pre-existing shaft by interconnecting the pre-existing shaft to a supporting surface. The plumber protector may include a collar body having sidewalls, a rear surface and a front surface, wherein the collar body forms a collar cutout adapted to accommodate the pre-existing shaft, and wherein the collar cutout extends to near a geometric center of the collar body. The sidewalls may provide a plurality of radial threaded apertures communicating with the collar cutout. The front surface may provide a plurality of fastener holes, each fastener hole communicating the front surface and the rear surface. The plumber protector may include a cover that sheaths the collar. The cover may include a cover cutout substantially similar to the collar cutout so that when the collar and the cover are operably engaged, the collar cutout and cover cutout define a shaft opening about the pre-existing shaft.

12 Claims, 4 Drawing Sheets

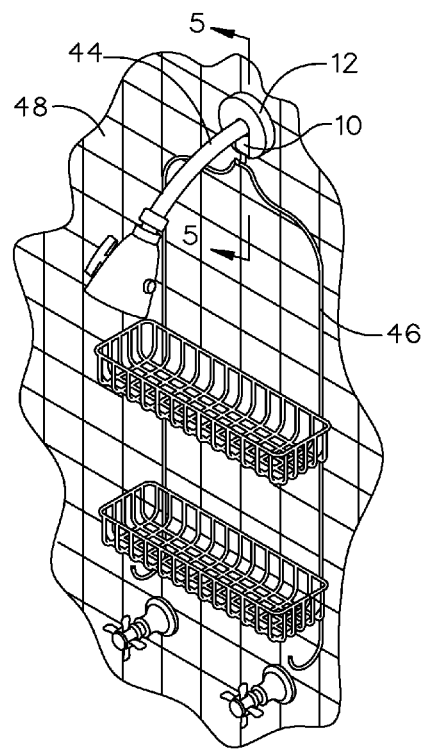
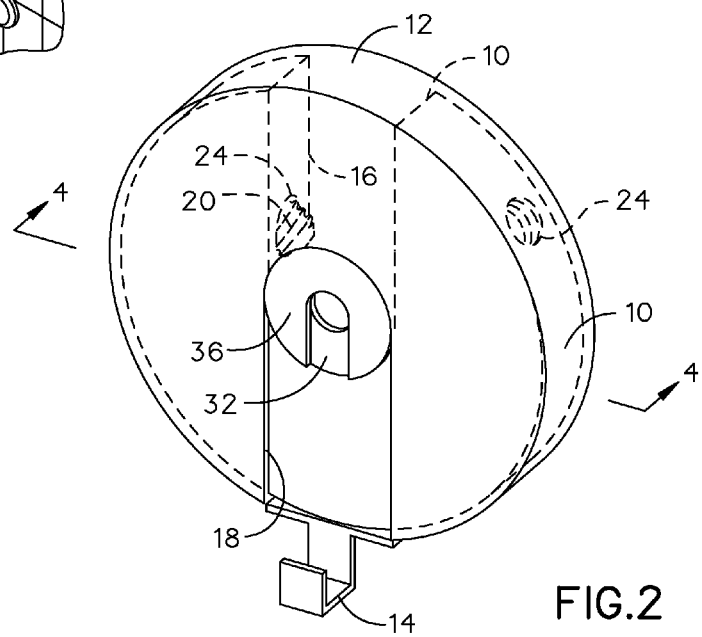
FIG.1
FIG.2

US 9,453,609 B2

PLUMBER PROTECTOR

BACKGROUND OF THE INVENTION

The present invention relates to pipe supports and, more particularly, to a one-size-fits-all device for supporting pre-existing pipes.

Providing structural support for pre-existing pipes, such as a shower pipes, or other conduits can be time consuming and expensive. Mostly because current pipe supports are designed for new construction, and so to apply them to pre-existing pipes requires taking the pipe out, which in turn requires removing at least one connecting element, such as a shower head, possibly removing a portion of wall, and/or calling a plumber.

As can be seen, there is a need for a device and method of easily supporting pre-existing pipes so that they are locked in place and/or capable of supporting greater weight.

SUMMARY OF THE INVENTION

In one aspect of the present invention, a plumber protector for supporting a pre-existing shaft by interconnecting the pre-existing shaft to a supporting surface, comprises: a collar body defined by a sidewall, a rear surface and a front surface, wherein the collar body comprises: a collar cutout adapted to accommodate the pre-existing shaft, and wherein the collar cutout extends to near a geometric center of the collar body; a plurality of radial threaded apertures communicating the sidewall and the collar cutout; and a plurality of fastener holes, each fastener hole communicating the front surface and the rear surface.

In another aspect of the present invention, a method of supporting a pre-existing shaft protruding through a support surface so that the pre-existing shaft is locked in place and capable of supporting greater weight, comprises the steps of: providing a plumber protector comprising: a collar body defined by a sidewall, a rear surface and a front surface, wherein the collar body comprises: a collar cutout adapted to accommodate the pre-existing shaft, and wherein the collar cutout extends to near a geometric center of the collar body; a plurality of radial threaded apertures communicating the sidewall and the collar cutout; and a plurality of fastener holes, each fastener hole communicating the front surface and the rear surface; positioning the collar body so that the pre-existing shaft is circumscribed by the collar cutout and the rear surface is substantially flush with the supporting surface; affixing a set screw through at least one radial threaded aperture so that the former connect to the pre-existing shaft; and fastening the collar body to the supporting surface by use of at least one fastener hole and at least one fastener therethrough.

In yet another aspect of the present invention, a plumber protector for supporting a pre-existing shaft by interconnecting the pre-existing shaft to a supporting surface, comprises: a collar body defined by a sidewall, a rear surface and a front surface, wherein the collar body comprises: a collar cutout adapted to accommodate the pre-existing shaft, and wherein the collar cutout extends to near a geometric center of the collar body; a plurality of radial threaded apertures communicating the sidewall and the collar cutout, wherein one of the radial threaded apertures is disposed diametrically opposed to the collar cutout; a plurality of fastener holes, each fastener hole communicating the front surface and the rear surface; a cover cutout diametrically opposed to the collar cutout, wherein the cover is adapted to accommodate the collar body so that the cover cutout and the collar cutout cooperate to define an adjustable pipe opening; and a hook attachable to the diametrically opposed radial threaded aperture.

These and other features, aspects and advantages of the present invention will become better understood with reference to the following drawings, description and claims.

BRIEF DESCRIPTION OF THE DRAWINGS

FIG. 1 is a perspective view of an exemplary embodiment of the present invention, illustrated in use;

FIG. 2 is a perspective view of an exemplary embodiment of the present invention;

DETAILED DESCRIPTION OF THE INVENTION

Figure 3:
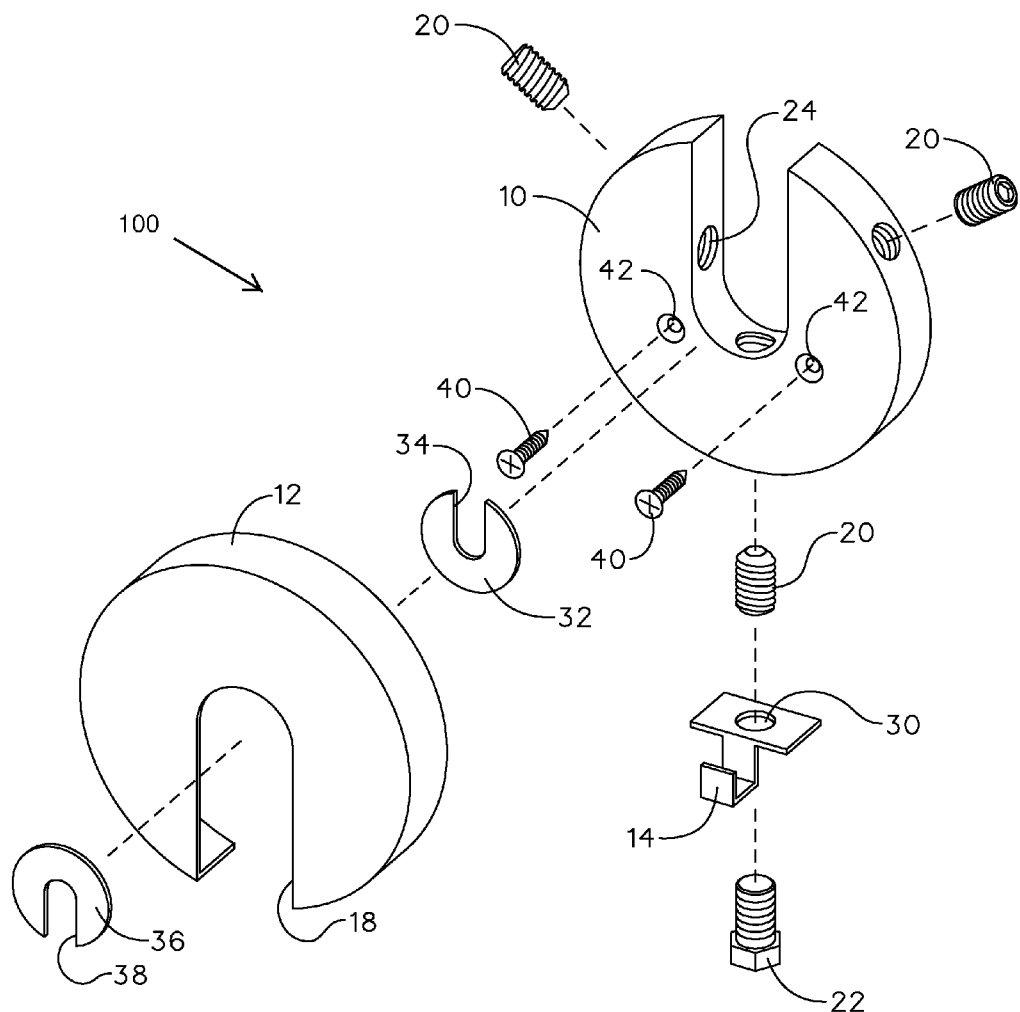
FIG. 3 is an exploded view of an exemplary embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a plumber protector for supporting a pre-existing shaft by interconnecting the pre-existing shaft to a supporting surface. The plumber protector may include a collar body having sidewalls, a rear surface and a front surface, wherein the collar body forms a collar cutout adapted to accommodate the pre-existing shaft, and wherein the collar cutout extends to near a geometric center of the collar body. The sidewalls may provide a plurality of radial threaded apertures communicating with the collar cutout. The front surface may provide a plurality of fastener holes, each fastener hole communicating the front surface and the rear surface. The plumber protector may include a cover that sheaths the collar. The cover may include a cover cutout substantially similar to the collar cutout so that when the collar and the cover are operably engaged, the collar cutout and cover cutout define a shaft opening about the pre-existing shaft.

Referring to FIGS. 1 through 9, the present invention may include a plumber protector 100 for supporting pre-existing pipes 44, shafts or the like. The plumber protector 100 may include a cover 12 adapted to snugly sheath a collar 10 forming a plate cutout 16.

The collar 10 may have a generally cylindrical body having an outer edge surface, a front surface and a rear surface, though the collar 10 body can be other geometric shapes and configurations. The plate cutout 16 may extend to and through a geometric center of the collar 10, wherein the plate cutout 16 may terminate in a semi-circular shape, as illustrated in FIG. 3. The semi-circular shape may share its center with the geometric center of the collar 10. The semi-circular shape may be sized to accommodate the diameters of many common pre-existing pipes 44.

The collar 10 may include a plurality of radial threaded apertures 24, each with a threaded set screw 20 engaged therein. Each radial threaded aperture 24 may communicate the outer edge surface to the plate cutout 16 near the geometric center of the collar 10.

In certain embodiments, the collar 10 may include a bottom radial threaded aperture 26, with a threaded set screw 20 engaged therein. The bottom radial threaded aperture 26 may communicate the outer edge surface to the plate cutout 16 near the geometric center of the collar 10, diametrically opposed to the plate cutout 16. The bottom radial threaded aperture 26 may be adapted to receive—in addition to the set screw 20—a hook fastener 22 for securing a hook 14 providing a fastener hole 30.

The collar 10 may define a plurality of fastener holes 42 communicating from the front surface to the rear surface. Each fastener hole 42 may be adapted to engage a wall fastener 40 therein so as to structurally connect the collar 10 to a supporting structure 48, such as a wall or framing members 52. The hook 14 may be adapted to support a basket 46, shower caddy, or the like so that the collar 10 carries the load of the basket, through the fastener 40, and into the supporting structure 48.

Figure 4:
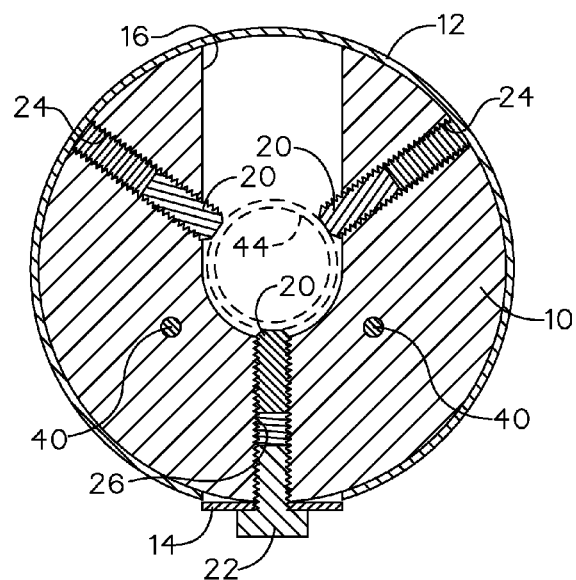
FIG. 4 is a section view of an exemplary embodiment of the present invention, taken along line 4-4 in FIG. 2.
Figure 5:
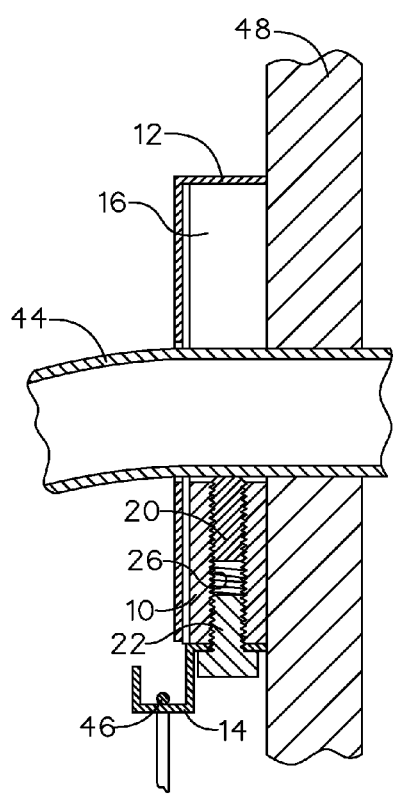
FIG. 5 is a section view of an exemplary embodiment of the present invention, taken along line 5-5 in FIG. 1.
Figure 6:
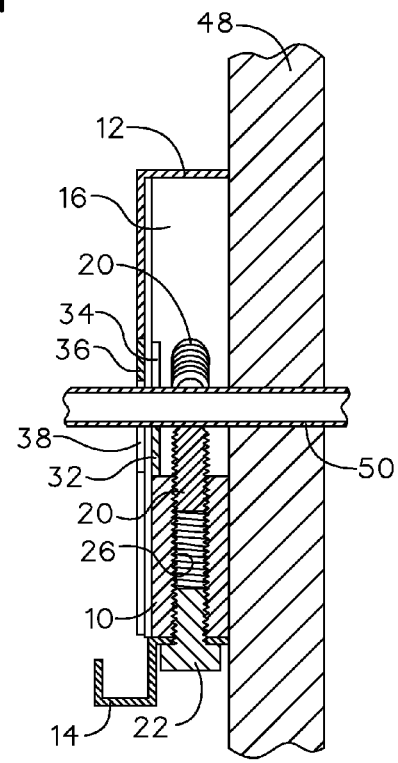
FIG. 6 is a section view of an exemplary embodiment of the present invention, illustrated in use.
Figure 7:
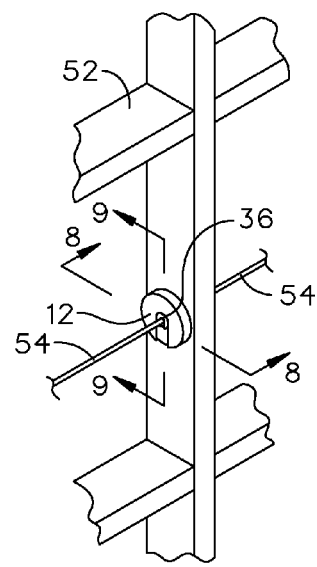
FIG. 7 is a perspective view of an exemplary embodiment of the present invention, illustrated in use.
Figure 8:
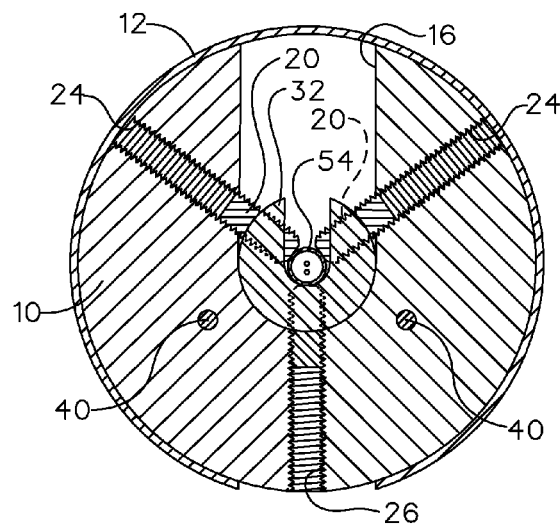
FIG. 8 is a section view of an exemplary embodiment of the present invention, taken along line 8-8 in FIG. 7.
Figure 9:
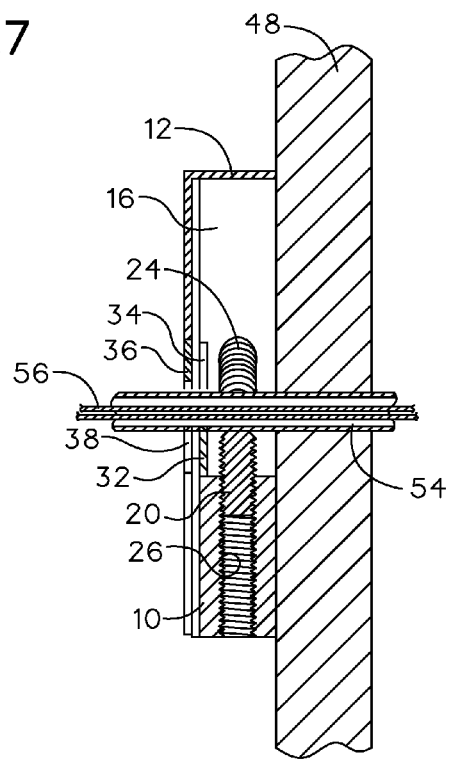
FIG. 9 is a section view of an exemplary embodiment of the present invention, taken along line 9-9 in FIG. 7.

The cover 12 may be substantially the same geometric shape, sharing substantially the same geometric center and forming a substantially same-sized cutout 18 as the collar 10. In use, when the cover 12 engages the collar 10, the cover cutout 18 may be disposed as the mirror image of the plate cutout 16 forming a diametrically adjustable pipe opening, as illustrated in FIG. 4.

The plumber protector 100 may provide complementary collar and cover knockout tabs 32, 36 for further restricting the diameter of the pipe opening, as illustrated in FIGS. 2 and 3; when, for example, the plumber protector 100 is supporting a small diameter pipe 50 or an electrical conduit 54 housing a wire 56, as illustrated in FIGS. 6 through 9. The collar and cover knockout tabs 32, 36 may form complementary cutouts 34, 38 reminiscent of their namesakes' cutouts 16, 18 and adapted to adjustably define the diameter of the pipe opening.

A method of using the present invention may include the following. The plumber protector 100 as disclosed above may be provided. A user may first install the collar 10 by positioning the predetermined pre-existing pipe 44 within the collar cutout 16 near the geometric center thereof, so that the rear surface is generally flush with the supporting wall 48. Then using the set screws 20 to engage the pipe 44, the user may maintain an operably static position of the collar 10 relative to said pipe 44. If the pipe 44 diameter can be initially positioned within the collar cutout 16, the pipe 44 can be supported for bearing additional loads and/or for preventing movement. As a result, the plumber protector 100 provides the ability to engage pre-existing pipes of various diameters without having to remove the pipe's connected elements or portions of the supporting wall 48.

Being thus held in place, the collar 10 may be rigidly connected to the supporting wall 48 by use of the plurality of wall fasteners 40. Then the user may further adjust the "locking system" of the plurality of set screws 20 so that the load path urged by the pipe 44 is substantially transferred through the set screws 20, through the collar 10, through the wall fasteners 40, and borne by the supporting wall 48.

In certain embodiments, the user may put an adhesive fastener, such as glue, on the rear surface in advance of positioning the predetermined pre-existing pipe 44 and then letting the adhesive fastener substantially adhere to the supporting wall 48 prior to setting the set screws 20 and so on, as the user may not initially know where pre-existing plumbing is behind the supporting wall 48 vis-à-vis the wall fasteners 40.

Once the collar 10 is secured, the user may sheath the collar 10 with the collar 12 by positioning the predetermined pre-existing pipe 44 within the cover cutout 18, so as to present an attractive aesthetic front of the plumber protector 100. Before or after the cover 12 is installed, the user may connect the hook 14 by means of the hook fastener 22 into the bottom aperture 26.

In certain embodiments, the user may further diametrically "dial-down" the resulting pipe opening by utilizing the collar and cover knockout tabs 32, 36 as illustrated in FIG. 3.

It should be understood, of course, that the foregoing relates to exemplary embodiments of the invention and that modifications may be made without departing from the spirit and scope of the invention as set forth in the following claims.

What is claimed is:

1. A plumber protector for supporting a pre-existing shaft by interconnecting the pre-existing shaft to a supporting surface, comprising:
    a collar body defined by a sidewall, a rear surface and a front surface, wherein the collar body comprises:
        a collar cutout adapted to accommodate the pre-existing shaft, and wherein the collar cutout extends to near a geometric center of the collar body;
        a plurality of radial threaded apertures communicating the sidewall and the collar cutout;
    a cover providing a cover cutout diametrically opposed to the collar cutout, wherein the cover is adapted to accommodate the collar body so that the cover cutout and the collar cutout cooperate to define an adjustable pipe opening;
    a plurality of complementary collar and cover knockout tabs for further restricting the diameter of the adjustable pipe opening; and
    a plurality of fastener holes, each fastener hole communicating the front surface and the rear surface.

2. The plumber protector of claim 1, wherein one of the radial threaded apertures is disposed diametrically opposed to the collar cutout, and further including a hook attachable to the diametrically opposed radial threaded aperture.

3. The plumber protector of claim 1, wherein each radial threaded apertures include a set screw.

4. The plumber protector of claim 1, wherein the collar cutout terminates in a semi-circular shape, wherein the semi-circular shape approximately shares a geometric center with the collar body.

5. The plumber protector of claim 4, wherein the cover cutout terminates in a semi-circular shape, wherein the semi-circular shape approximately shares a geometric center with the collar body.

6. A method of supporting a pre-existing shaft protruding through a support surface so that the pre-existing shaft is locked in place and capable of supporting greater weight, comprising the steps of:
    providing a plumber protector comprising: a collar body defined by a sidewall, a rear surface and a front surface, wherein the collar body comprises: a collar cutout adapted to accommodate the pre-existing shaft, and wherein the collar cutout extends to near a geometric center of the collar body; a plurality of radial threaded apertures communicating the sidewall and the collar cutout; and a plurality of fastener holes, each fastener hole communicating the front surface and the rear surface;

providing a cover defining a cover cutout diametrically opposed to the collar cutout, and covering the collar body so that the cover cutout and the collar cutout cooperate to collar the pre-existing shaft, wherein the cover cutout and the collar cutout each terminate in a semi-circular shape, and wherein the semi-circular shape approximately shares a geometric center with the collar body;

positioning the collar body so that the pre-existing shaft is circumscribed by the collar cutout and the rear surface is substantially flush with the supporting surface;

affixing a set screw through at least one radial threaded aperture so that the former connect to the pre-existing shaft; and fastening the collar body to the supporting surface by use of at least one fastener hole and at least one fastener therethrough.

7. The method of claim 6, further including applying an adhesive to the rear surface for securing the rear surface to the supporting surface prior to affixing the set screws.

8. The method of claim 6, further including positioning the collar body so that its geometric center is approximately shared by the pre-existing shaft.

9. The method of claim 6, wherein one of the radial threaded apertures is disposed diametrically opposed to the collar cutout, and attaching a hook to the diametrically opposed radial threaded aperture.

10. The method of claim 6, further including providing complementary collar and cover knockout tabs within the cutouts so as to collar the pre-existing shaft.

11. A plumber protector for supporting a pre-existing shaft by interconnecting the pre-existing shaft to a supporting surface, comprising:

a collar body defined by a sidewall, a rear surface and a front surface, wherein the collar body comprises:

a collar cutout adapted to accommodate the pre-existing shaft, and wherein the collar cutout extends to near a geometric center of the collar body;

a plurality of radial threaded apertures communicating the sidewall and the collar cutout, wherein one of the radial threaded apertures is disposed diametrically opposed to the collar cutout;

a plurality of fastener holes, each fastener hole communicating the front surface and the rear surface;

a cover providing a cover cutout diametrically opposed to the collar cutout, wherein the cover is adapted to accommodate the collar body so that the cover cutout and the collar cutout cooperate to define an adjustable pipe opening, wherein the collar cutout and the cover cutout each terminate in a semi-circular shape, and wherein each semi-circular shape approximately shares a geometric center with the collar body; and a hook attachable to the diametrically opposed radial threaded aperture.

12. The plumber protector of claim 11, wherein each radial threaded apertures include a set screw.

* * * * *